United States Patent
Dahal

(10) Patent No.: US 8,961,911 B2
(45) Date of Patent: Feb. 24, 2015

(54) SELECTIVE LEACH RECOVERY OF ZINC FROM A COMPOSITE SULPHIDE ORE DEPOSIT, TAILINGS, CRUSHED ORE OR MINE SLUDGE

(75) Inventor: Madhav Dahal, Toronto (CA)

(73) Assignee: Yava Technologies Inc., Toronto, Ontario (CA)

( * ) Notice: Subject to any disclaimer, the term of this patent is extended or adjusted under 35 U.S.C. 154(b) by 4 days.

(21) Appl. No.: 13/876,901

(22) PCT Filed: Sep. 30, 2011

(86) PCT No.: PCT/CA2011/001094
§ 371 (c)(1),
(2), (4) Date: Apr. 22, 2013

(87) PCT Pub. No.: WO2012/040829
PCT Pub. Date: Apr. 5, 2012

(65) Prior Publication Data
US 2013/0216456 A1    Aug. 22, 2013

Related U.S. Application Data

(60) Provisional application No. 61/404,244, filed on Sep. 30, 2010.

(51) Int. Cl.
*C01G 9/00* (2006.01)
*C22B 19/02* (2006.01)
*C22B 3/00* (2006.01)

(52) U.S. Cl.
CPC .................. *C22B 19/02* (2013.01); *C22B 19/24* (2013.01)
USPC ............ 423/101; 423/102; 423/105; 423/109

(58) Field of Classification Search
None
See application file for complete search history.

(56) References Cited

U.S. PATENT DOCUMENTS

| | | | | |
|---|---|---|---|---|
| 3,515,510 A | * | 6/1970 | Satterwhite et al. | 423/109 |
| 3,927,170 A | | 12/1975 | Dixon et al. | |
| 4,153,522 A | * | 5/1979 | Arbiter et al. | 205/580 |
| 4,272,341 A | | 6/1981 | Lamb | |
| 4,331,635 A | * | 5/1982 | Arbiter et al. | 423/33 |
| 4,500,398 A | | 2/1985 | Cole, Jr. et al. | |
| 5,523,066 A | | 6/1996 | Geisler et al. | |
| 6,726,828 B2 | | 4/2004 | Turner et al. | |
| 7,465,334 B2 | | 12/2008 | Moyes et al. | |

FOREIGN PATENT DOCUMENTS

| | | |
|---|---|---|
| CN | 1414121 A | 4/2003 |
| CN | 1456692 A | 11/2003 |
| RU | 2006 141 445 | 5/2008 |
| WO | WO 98/36102 | 8/1998 |
| WO | WO 03/023077 | 3/2003 |

OTHER PUBLICATIONS

Translation of RU2352652, Apr. 2009.*
Translation of CN 1456692, Nov. 2003.*
Translation of CN 1414121, Apr. 2003.*
International Search Report of PCT/CA2011/001094, date of mailing Jan. 6, 2012.
International Preliminary Report on Patentability of PCT/CA2011/001094, dated Apr. 2, 2013, with Written Opinion of the International Searching Authority, dated Dec. 8, 2011.
Chinese Office Action dated Apr. 14, 2014 in Chinese Application No. 201180057747.5 with English translation.
Panamanian Examination Report dated Mar. 18, 2014 in Panamanian Registration No. 89635-01.

* cited by examiner

*Primary Examiner* — Steven Bos
(74) *Attorney, Agent, or Firm* — Collard & Roe, P.C.

(57) ABSTRACT

Zinc and lead are usually concomitantly present in Zn—Pb ores and tailings. A novel non-polluting hydrometallurgical process for selectively leaching and recovering zinc (Zn) from a composite lead (Pb) and zinc sulphide containing mineral, crushed untreated rock or unconsolidated mineral particles, mill tailings and/or agglomerated or unagglomerated sulphidic zinc containing waste material without necessitating smelting and refining operation has been developed. A combination of selected oxidant and alkali metal hydroxide has been found effective. A leachant consisting of e.g. a mixture of sodium hydroxide (NaOH) and sodium hypochlorite (NaOCl) is employed to selectively dissolve zinc sulphide at high pH at standard temperature and pressure (STP). The kinetics of leaching along with the effect of varying concentration (preferably of sodium hydroxide and sodium hypochlorite) were systematically investigated. Feed ore containing diverse set of minerals e.g. sulphides and carbonates can also be conveniently treated to selectively and almost quantitatively recover zinc as high purity zinc carbonate. This technology can be employed either in-situ or ex-situ based on the amenability of a particular type of mineral deposit or feed ore.

10 Claims, 3 Drawing Sheets

SELECTIVE LEACH RECOVERY OF ZINC FROM A COMPOSITE SULPHIDE ORE DEPOSIT, TAILINGS, CRUSHED ORE OR MINE SLUDGE

CROSS REFERENCE TO RELATED APPLICATIONS

This application is the National Stage of PCT/CA2011/001094 filed on Sep. 30, 2011, which claims priority under 35 U.S.C. §119(e) of U.S. Provisional Application No. 61/404,244 filed on Sep. 30, 2010, the disclosure of which is incorporated by reference. The international application under PCT article 21(2) was published in English.

BACKGROUND OF THE INVENTION

Lead and zinc sulphides generally undergo similar oxidation-reduction reactions. As a result, there is no known method to leach and recover zinc selectively from composite lead-zinc sulphidic minerals. This invention deals with a selective leaching and recovery of zinc from composite zinc and usually lead-bearing sulphides, which are either in the form of complex zinc and lead metal containing sulphidic minerals, or in the form of zinc sulphide concentrates, in-situ- or ex-situ in an economic and environmentally friendly manner.

Zinc is the fourth most common metal in use, trailing only iron, aluminium, and copper. It is normally found in association with other base metals such as copper and lead in naturally occurring ores. Zinc has a low affinity for oxides and prefers to bond with sulphides. Sphalerite, which is a form of zinc sulphide, is the most heavily mined zinc-containing ore. The major uses of zinc are anti-corrosion coatings on steel (galvanizing), precision components (die casting), construction material, brass, dry batteries, pharmaceuticals and cosmetics and micronutrient for humans, animals and plants. The oxide is used in the manufacture of paints, rubber products, floor coverings, plastics, printing inks, soap, textiles, electrical equipment, and other products.

Conventional extractive metallurgical process generally involves pyrometallurgical methods for recovering zinc values from zinc sulphides. Known recovery process mostly involves grinding the ore, froth flotation (which selectively separates minerals from gangue by taking advantage of differences in hydrophobicity) to get an ore concentrate, roasting and reduction with carbon or electrowinning. However, such treatment often entails expensive mining and beneficiation process steps to concentrate the sulphides. In addition, the production of zinc employing the known technology from sulphidic zinc ores produces large amounts of sulfur dioxide, carbon dioxide and cadmium vapor. Smelter slag and other residues of process also contain significant amounts of heavy metals. The dumps of the past mining operations leach significant amounts of zinc and cadmium. Soils contaminated with zinc through the mining of zinc-containing ores, refining, or where zinc-containing sludge is used as fertilizer, can contain several grams of zinc per kilogram of dry soil. Levels of zinc in excess of 500 ppm in soil are deemed to interfere with the ability of plants to absorb other essential metals, such as iron and manganese. Further, strict adherence to environmental regulations governing mining operations may substantially increase the cost of recovering zinc from its ores by conventional processes.

A patent search revealed only approaches to simultaneously leach both lead and zinc from composite lead-zinc sulphidic minerals. Geisler in U.S. Pat. No. 5,523,066 and Turner in U.S. Pat. No. 6,726,828, describe use of in-situ leach mining utilizing a mixture of acetic acid and hydrogen peroxide (for sulphide oxidation) to recover Ca, Mn, Pb and Zn as a combined leachate from a permeable geological host. Both methods employ hydrogen peroxide as an oxidant. The decomposition of hydrogen peroxide with time and its effect on the overall recovery process is left unexplained. U.S. Pat. No. 4,500,398 uses fluosilicic acid with an oxidant to dissolve sulphides. Neither of these methods suggests selective leaching of zinc from composite lead-zinc sulphidic minerals proposed herein.

SUMMARY OF THE INVENTION

A new hydrometallurgical method has been found for selective dissolution of zinc from composite zinc sulphidic minerals.

The invention comprises a process for selective leaching of zinc from mixtures and ores containing zinc sulphide, comprising:
  a. contacting the mixture or ore with an aqueous leachant comprising: 1) an oxidant selected to oxidize the sulphur present only to elemental sulphur, and 2) alkali metal hydroxide in amounts sufficient to form soluble alkali metal zincate;
  b. extending the contact time between leachant and solids to give the desired zinc recovery and selectivity in the leachate while maintaining operative reagent concentrations;
  c. separating the desired leachate from the residual solids; and
  d. recovering zinc from the leachate.

The oxidant may be selected from the group consisting of an oxygen-containing gas, a water-soluble peroxide, a water-soluble perchlorate and a water-soluble hypochlorite.

Preferably the oxidant is a hypochlorite in a concentration sufficient to oxidize all of the sulphides present.

When the starting solids also contain lead sulphide, the resulting leachate is substantially free of lead after an extended contact time.

The desired oxidation potential of the leachant for steps a) and b) is maintained by reagent addition. The desired alkali metal hydroxide content of the leachant is maintained throughout the leaching steps a) and b). The contact time in steps a) and b) is extended for up to about 24 hours to attain desired recovery and selectivity.

The invention includes an aqueous leachant composition selected to solubilize zinc selectively from zinc sulphide-containing sulphidic minerals and mixtures, comprising:
  1) an oxidant selected to oxidize the sulphur from the sulphides only to the elemental sulphur stage; and
  2) an alkali metal hydroxide selected to form soluble alkali metal zincates from zinc sulphide oxidation products.

In a preferred aspect the composite sulphides are treated with a mixture of sodium hydroxide and sodium hypochlorite at ambient temperature and pressure. Sodium hypochlorite is used as an oxidant to oxidize sulphide in the composite mineral to elemental sulphur. Zinc oxide thus formed reacts with sodium hydroxide to form soluble sodium zincate which is subsequently treated to recover zinc as high purity zinc carbonate. Zinc carbonate can be easily converted to other zinc products based on end-user requirements.

In another embodiment of the invention zinc sulphide containing unconsolidated minerals, including discrete blocks of rocks and agglomerated ore particles and concentrate, agglomerated and unagglomerated zinc sulphide bearing mill tailings of mineral beneficiation and similar zinc sulphide containing by-products and waste products of recycling processes, are leached ex-situ, at ambient temperature and pressure, with a solution containing sodium hydroxide and sodium hypochlorite. The pregnant leach solution is subsequently removed and is treated for zinc recovery.

BRIEF DESCRIPTION OF THE DRAWINGS

In the drawings, which form part of this application.

DESCRIPTION OF PREFERRED EMBODIMENTS

Figure 1:
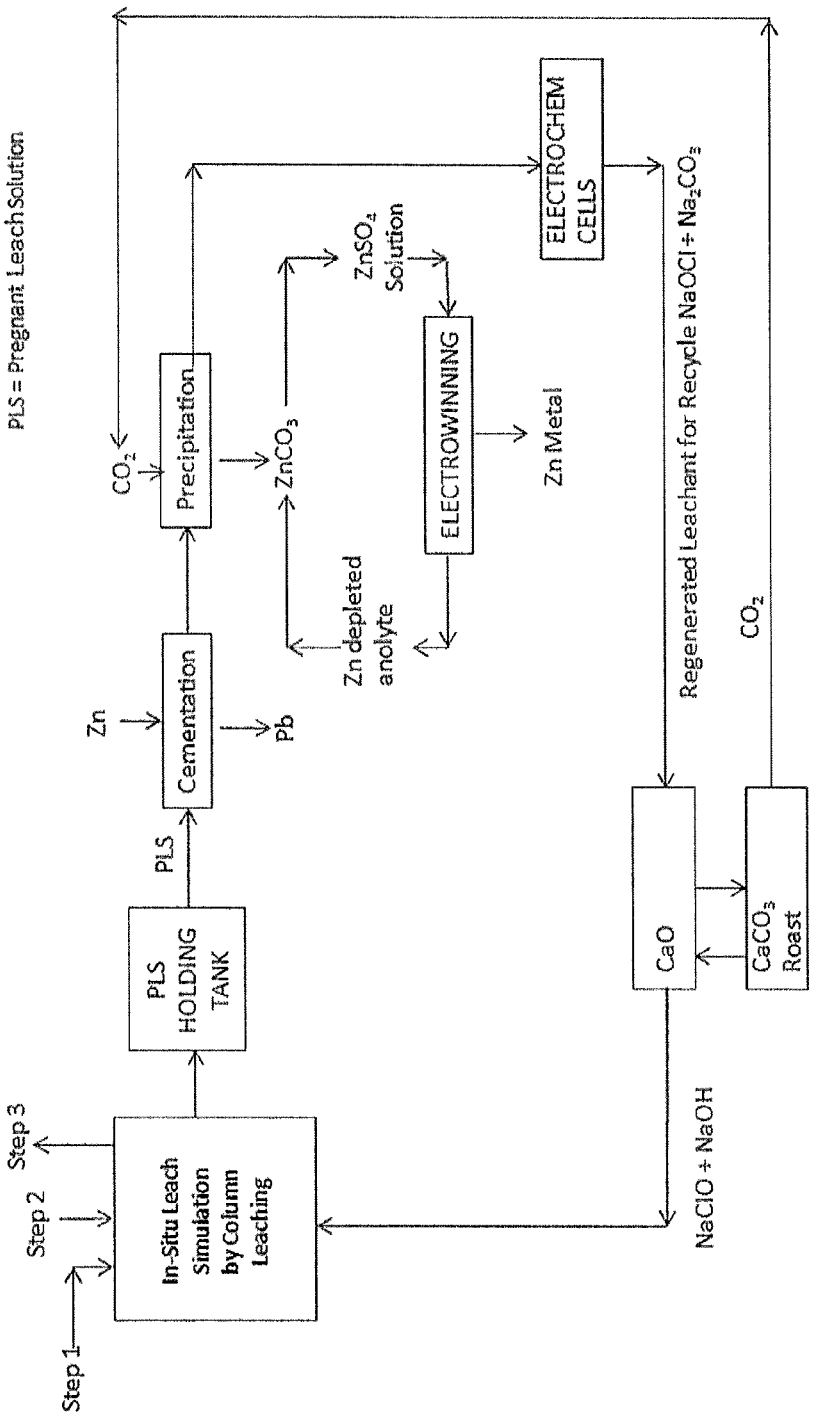
FIG. 1 is a flowsheet of the process of the invention.

FIG. 1 is a flowsheet of the process of recovery of zinc as zinc carbonate/zinc metal from the leachate obtained by leaching a composite lead-zinc sulfide mineral with a leachant consisting of a mixture of sodium hypochlorite and sodium hydroxide.

A leachant consisting of a mixture of sodium hydroxide and sodium hypochlorite is prepared by diluting concentrated reagent grade solutions to a pre-determined concentration level and mixing them thoroughly in a stirred tank reactor. A composite lead-zinc sulfide mineral is then treated with the leachant thus prepared for the dissolution of sulfides by oxidative dissolution process. The leach liquor containing the dissolved metal ions is collected in a pregnant leach solution (PLS) holding tank. Any lead present in the leachate is separated and recovered as lead metal employing cementation, a well known art in the industry. Carbon dioxide gas is bubbled through the lead depleted leachate to precipitate zinc as solid zinc carbonate, which is separated by solid-liquid filtration. Zinc carbonate thus recovered is dissolved is sulfuric acid to produce zinc sulfate solution for electrolytic recovery of zinc as zinc metal.

The lead and zinc depleted leachate is passed through an electrochemical cell to regenerate sodium hypochlorite. The regenerated solution mixture containing sodium hypochlorite and sodium carbonate is treated with quick lime or calcium oxide to precipitate calcium carbonate and regenerate sodium hydroxide. The precipitated calcium carbonate is separated by solid-liquid filtration. The filtrate consisting of a mixture of sodium hypochlorite and sodium hydroxide is recycled for further leaching. Calcium carbonate is roasted to produce carbon dioxide gas and calcium oxide. Carbon dioxide gas is recycled to precipitate zinc carbonate and calcium oxide is recycled to regenerate sodium hydroxide solution. The overall process runs as a closed-loop operation.

In one aspect of the present process for solubilizing zinc from composite zinc-sulphidic minerals in the ore body, crushed ore or tailings, a solution consisting of a mixture of sodium hydroxide and sodium hypochlorite is used. In one of the preferred embodiments of the present invention the sulphide bearing minerals in the ore are brought into contact with a mixture of sodium hydroxide and sodium hypochlorite at high pH. The leach solution reacts with the sulphidic minerals to attain the highest metal ion concentration to render the leaching process economical as determined by the kinetics of the process. The pregnant solution containing the dissolved value metals, in particular solubilized zinc, are recovered from the leach solution by precipitating zinc as zinc carbonate. Sodium hydroxide (one of the most common laboratory reagents) combined with sodium hypochlorite (commonly referred to as bleach) ensures that the reagents utilized in the leaching process are not likely to damage the environment. The leaching process is conducted at ambient temperature and pressure.

In one preferred embodiment, at a concentration e.g. of about 0.48M sodium hypochlorite and e.g. about 1.35M sodium hydroxide, about 96% of zinc was extracted in less than 24 hours while lead recovery was less than about 1%. Zinc leaching kinetics was observed to be the exact opposite of lead leaching kinetics. While lead recovery percentage rapidly declined from an initial about 15-25% extraction, largely attributable to the precipitation of lead as lead dioxide due to over-oxidation, zinc recovery percentage rapidly increased initially and formed a plateau. Zinc is recovered from the solution as zinc carbonate and sodium chloride dissolved in solution is electrolyzed to regenerate the original leachant forming a closed-loop process.

The recovery of metals from their sulphides by hydrometallurgical methods usually necessitates the oxidation of the sulphide ion in the metal sulphide to render the metal soluble and hence recoverable from the solution. It has been found that for best results the sulphide in the sulphidic minerals is oxidized only to elemental sulphur, hence the oxidation potential of the oxidant in the leach solution is adjusted such that it is insufficient to oxidize the sulphide to the hexavalent state. The oxidation potential of a reagent is understood to mean the power of the reagent to remove electrons and it may be expressed quantitatively in millivolts. In the present process for leaching zinc from zinc sulphidic minerals by a mixture of sodium hydroxide and sodium hypochlorite, the oxidant (sodium hypochlorite) could be potentially replaced by oxygen or air, making the process even more economic. Other alkali metals e.g. K could replace sodium. Selective dissolution of zinc sulphide from composite zinc-lead sulphidic minerals is largely attributed to over-oxidation of lead leading to reprecipitation of lead as lead dioxide during the leaching process attributable to the following reactions:

$$PbO + 2OH^- + H_2O \rightarrow Pb(OH)_4^{2-}$$

$$Pb(OH)_4^{2-} + Cl_2 \rightarrow PbO_2 + 2Cl^- + 2H_2O$$

The chemistry involved in the alkaline leaching process is as follows:

1. Chlorine and sodium hydroxide are produced by electrolysis of aqueous sodium chloride solution.

$$2NaCl + 2H_2O \rightarrow Cl_2 + H_2 + 2NaOH$$

2. Sodium hypochlorite is produced by mixing chlorine with sodium hydroxide.

$$4Cl_2(g) + 8NaOH \rightarrow 4NaClO + 4NaCl + 4H_2O$$

3. Sodium hypochlorite reacts with zinc sulphide in presence of sodium hydroxide to produce soluble sodium zincate, sodium chloride and elemental sulphur.

$$NaClO + ZnS(s) + NaOH \rightarrow NaZnOOH + NaCl + S°$$

4. Soluble sodium zincate produced in step 3 is treated with carbon dioxide gas to precipitate insoluble zinc carbonate.

$$NaZnOOH + NaOH + 2CO_2(g) \rightarrow ZnCO_3(s) + Na_2CO_3 + H_2O$$

5. Sodium hydroxide is regenerated by treating sodium carbonate produced in step 4 with quick lime.

$$CaO + H_2O + Na_2CO_3 \rightarrow CaCO_3(s) + 2NaOH$$

6. Calcium carbonate produced in step 5 is calcined to regenerate quick lime and carbon dioxide gas, which are recycled.

$$CaCO_3 \rightarrow CaO+CO_2$$

7. Pure zinc metal is produced by the electrolysis of zinc sulphate solution produced by dissolving zinc carbonate precipitate from step 4 in sulphuric acid.

$$ZnCO_3+H_2SO_4 \rightarrow ZnSO_4+H_2O+CO_2$$

$$Zn^{2+}+2e^- \rightarrow Zn$$

A bleed solution is intermittently treated to remove the impurities built up during the leaching process.

The present invention has the additional advantage that it does not entail preconcentration of the minerals, which may require costly mining expenditures and equipment. The process does not create acid drainage problems and uses relatively environmentally benign reagents.

Example 1

50 g of crushed ore was placed in a bottle with 450 ml lixiviant. The lixiviant was prepared by mixing 300 ml consumer grade sodium hypochlorite (NaOCl) with 150 ml deionized water and 24.3 g sodium hydroxide (NaOH). The target concentrations prior to testing were 1.35M NaOH and 0.6M NaOCl. The mixture was continuously stirred with a magnetic stirrer. 20 ml samples were collected at fixed interval of time and quantitatively analyzed for both lead and zinc concentration. Approximately 96% of zinc was recovered in less than 24 hours. Lead concentration in the solution at the end of 24 hours period of the experiment was found to be less than 1%.

Example 2

Column test was conducted to mimic in-situ leaching. Approximately 120 g crushed ore, containing composite lead and zinc sulphidic minerals was lightly ground with a mortar/pestle and packed in a 1.27 cm-ID (internal diameter)×51 cm-L clear vinyl tube. Small plugs of glass wool were placed on the ends of the tubing, acting as particulate filters as the liquid goes through the column, Tapping the sides of the column ensured uniform packing. Prior to leaching, $N_2$ sparged deionized water was pumped through the column to remove any entrapped air. The deionized water was left in the sealed column overnight.

The lixiviant (0.675M NaOH and 0.48M NaOCl) was pumped upward through the column, at relatively constant flow rate using a peristaltic pump. The effluent was collected in a separatory funnel. 10-15 ml aqueous samples were collected at the exit of the column at pre-set time intervals and quantitatively analyzed for lead and zinc concentration. The target flow rate was 1 ml/min, translating into approx 20 minutes residence time in the column. The actual average flow rate throughout the 22.5 hours testing period was 1.05 ml/min. While approximately 81% of zinc was recovered, only about 1% lead was extracted.

Detailed kinetic leaching tests were performed at various sodium hydroxide and sodium hypochlorite concentrations. Table 1 summarizes the experimental results illustrated in FIGS. 2, 3 and 4.

TABLE 1

Experimental results for leaching composite lead-zinc sulfide mineral

| | Time (h) | Volume (ml) | % Lead Extraction % | % Zinc Extraction % |
|---|---|---|---|---|
| a) | 1 | 450 | 11% | 50% |
| 0.24M NaOCl | 2 | 442 | 9% | 58% |
| 0.675M NaOH | 4 | 434 | 6% | 66% |
| | 24 | 426 | 1% | 76% |
| | 48 | 418 | 2% | 74% |
| | 51 | 460 | 1% | 74% |
| | 72 | 452 | 0% | 75% |
| b) | 1 | 450 | 25% | 46% |
| 0.24M NaOCl | 2 | 442 | 23% | 57% |
| 1.35M NaOH | 4 | 434 | 21% | 69% |
| | 24 | 426 | 14% | 84% |
| | 48 | 418 | 7% | 83% |
| | 51 | 460 | 4% | 85% |
| | 72 | 452 | 0% | 86% |
| c) | 1 | 450 | 5% | 55% |
| 0.48M NaOCl | 2 | 442 | 5% | 64% |
| 0.675M NaOH | 4 | 434 | 4% | 72% |
| | 24 | 426 | 1% | 81% |
| | 48 | 418 | 1% | 79% |
| | 72 | 410 | 1% | 74% |
| d) | 1 | 450 | 20% | 61% |
| 0.48M NaOCl | 2 | 442 | 17% | 71% |
| 1.35M NaOH | 4 | 434 | 15% | 80% |
| | 24 | 426 | 1% | 96% |
| | 48 | 418 | 1% | 95% |
| | 72 | 410 | 0% | 89% |

Figure 2:
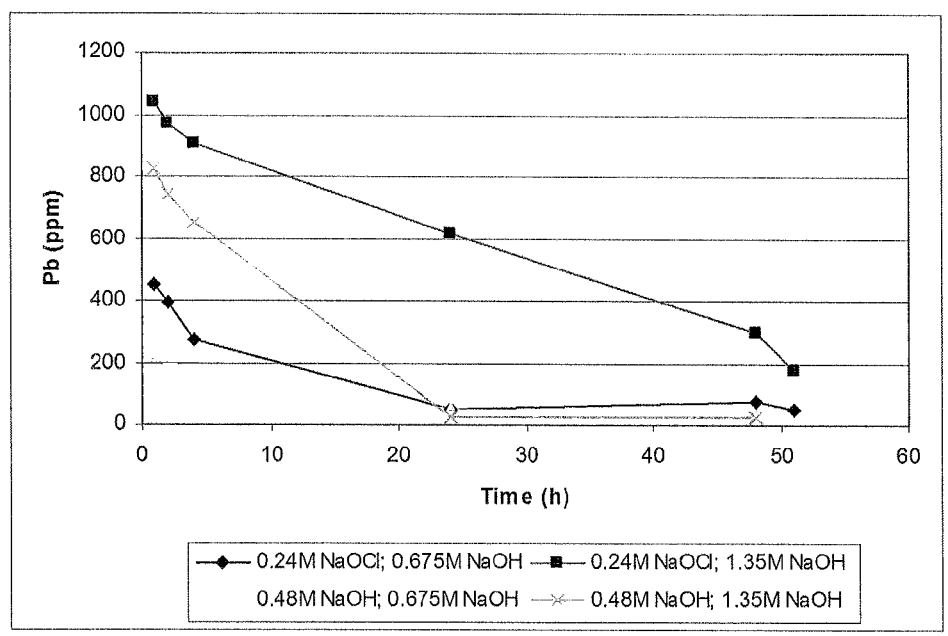
FIG. 2 is a graph showing cumulative lead concentration in solution at various NaOH and NaOCl concentrations.

FIG. 2 shows the quantity of lead that remains dissolved in the leachate after leaching a composite lead-zinc sulfide mineral employing a leachant consisting of a mixture of sodium hydroxide and sodium hypochlorite. The effect of variable concentrations of sodium hypochlorite at various sodium hydroxide concentrations clearly indicates that there is a rapid decrease in the quantity of dissolved lead in the leachate with time.

Figure 3:
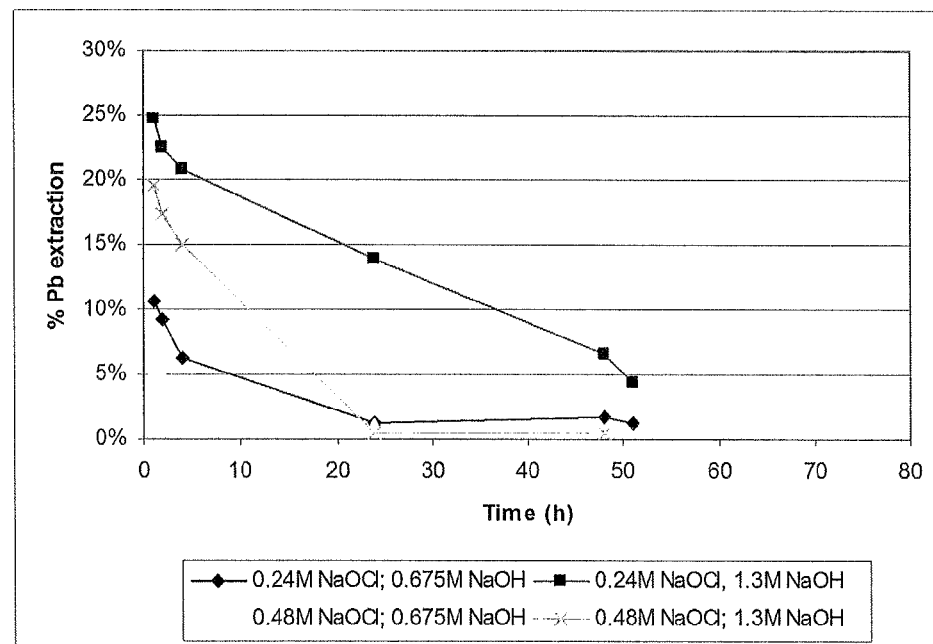
FIG. 3 is a graph showing NaOH and NaOCl concentration influence on lead extraction.

FIG. 3 shows the kinetic efficiency of lead extraction on leaching a mixture of composite lead-zinc sulfide mineral employing a leachant consisting of a mixture of sodium hydroxide and sodium hypochlorite. The effect of variable concentrations of sodium hypochlorite at various sodium hydroxide concentrations again indicates that there is a rapid decrease in the efficiency of lead extraction with time.

Figure 4:
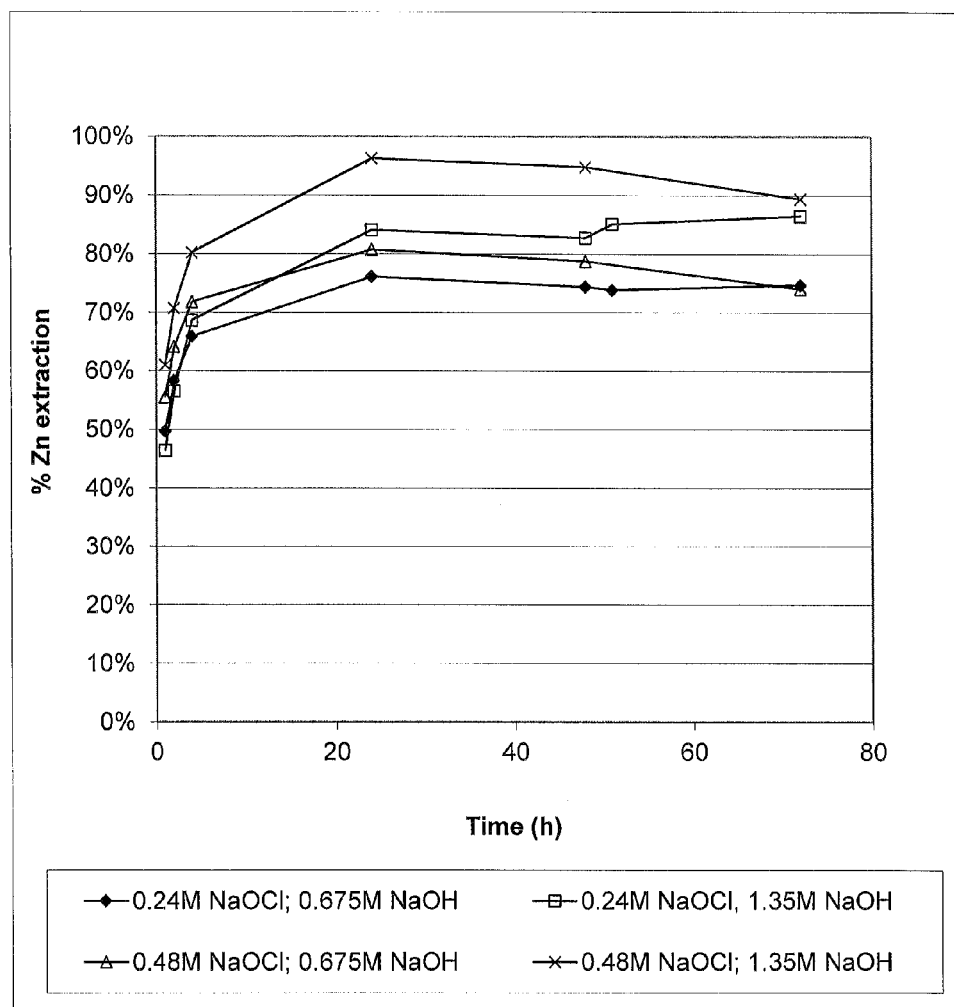
FIG. 4 is a graph showing NaOH and NaOCl concentration influence on zinc extraction.

FIG. 4 shows the kinetic efficiency of zinc extraction on leaching a mixture of composite lead-zinc sulfide mineral employing a leachant consisting of a mixture of sodium hydroxide and sodium hypochlorite. In direct contrast to lead extraction efficiency, the effect of variable concentrations of sodium hypochlorite at various sodium hydroxide concentrations clearly indicates a rapid and a highly efficient recovery of zinc extraction with time.

Although the present invention has been described with reference to the preferred embodiments, it is to be understood that modifications and variations may be resorted to without departing from the spirit and scope of the invention, as those skilled in the art readily understand. Such modifications and variations are considered to be within the purview and scope of the invention and the appended claims.

I claim:

1. A process for selective leaching of zinc from a mixture or ore containing zinc sulfide, comprising:
   a. contacting the mixture or ore with an aqueous leachant to form a resulting leachate and residual solids from the mixture or ore, said leachant comprising: 1) an oxidant with an oxidation potential to oxidize the sulfur present only to elemental sulfur, and 2) alkali metal hydroxide in an amount sufficient to form soluble alkali metal zincate;
  b. extending the contact time between leachant and solids to reach a selected zinc recovery and selectivity in the leachate while maintaining operative reagent concentrations;
  c. separating desired resulting leachate from the residual solids; and
  d. recovering zinc from the resulting leachate,
    wherein the oxidant is a water-soluble perchlorate or a water-soluble hypochlorite.

2. The process of claim 1, wherein the oxidant is sodium hypochlorite.

3. The process of claim 1, wherein the oxidant is a water-soluble hypochlorite in a concentration sufficient to oxidize all of the sulfides present.

4. The process of claim 1, wherein the leachant contains sodium hypochlorite and sodium hydroxide.

5. The process of claim 1, wherein the mixture or ore also contains lead sulfide, and the resulting leachate is substantially free of lead after an extended contact time.

6. The process of claim 1, wherein the oxidation potential of the leachant for steps a) and b) is maintained by reagent addition.

7. The process of claim 1, wherein the amount of alkali metal hydroxide in the leachant is maintained throughout the leaching steps a) and b).

8. The process of claim 1, wherein the contact time in steps a) and b) is extended for up to about 24 hours to attain the selected zinc recovery and selectivity.

9. The process of claim 1, in which zinc in step d) is recovered by precipitation as zinc carbonate.

10. A process for selective leaching of zinc from a mixture or ore containing zinc sulfide, comprising:
  a. contacting the mixture or ore with an aqueous leachant to form a resulting leachate and residual solids from the mixture or ore, said leachant comprising: 1) an oxidant with an oxidation potential to oxidize the sulfur present only to elemental sulfur, and 2) alkali metal hydroxide in an amount sufficient to form soluble alkali metal zincate;
  b. extending the contact time between leachant and solids to reach a selected zinc recovery and selectivity in the leachate while maintaining operative reagent concentrations;
  c. separating the resulting leachate from the residual solids; and
  d. recovering zinc from the resulting leachate,
wherein the oxidant is sodium hypochlorite and the alkali metal hydroxide is sodium hydroxide.

* * * * *

UNITED STATES PATENT AND TRADEMARK OFFICE
CERTIFICATE OF CORRECTION

| | |
|---|---|
| PATENT NO. | : 8,961,911 B2 |
| APPLICATION NO. | : 13/876901 |
| DATED | : February 24, 2015 |
| INVENTOR(S) | : Dahal |

Page 1 of 1

It is certified that error appears in the above-identified patent and that said Letters Patent is hereby corrected as shown below:

In the Claims,

Column 7, line 7 (Line 1 of paragraph c. in Claim 1), please change "desired" to correctly read:

--the--.

Signed and Sealed this
Second Day of June, 2015

Michelle K. Lee
*Director of the United States Patent and Trademark Office*